J. BOOTH.
MACHINE FOR COVERING WIRE WITH FIBROUS MATERIAL.
APPLICATION FILED APR. 5, 1919.
1,343,076.
Patented June 8, 1920.
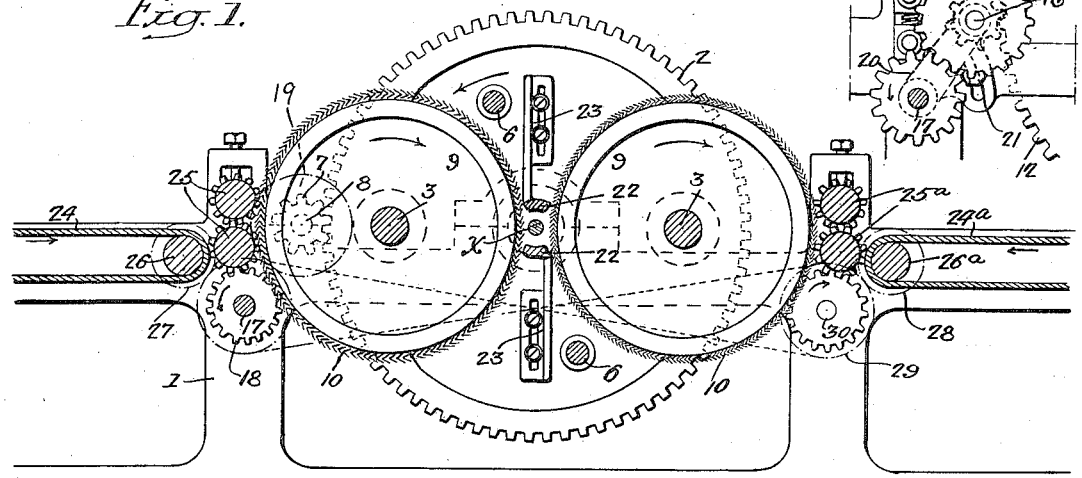
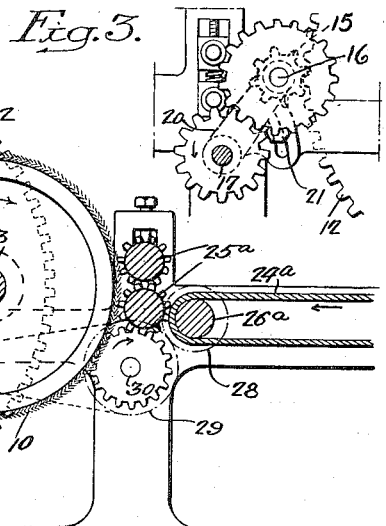
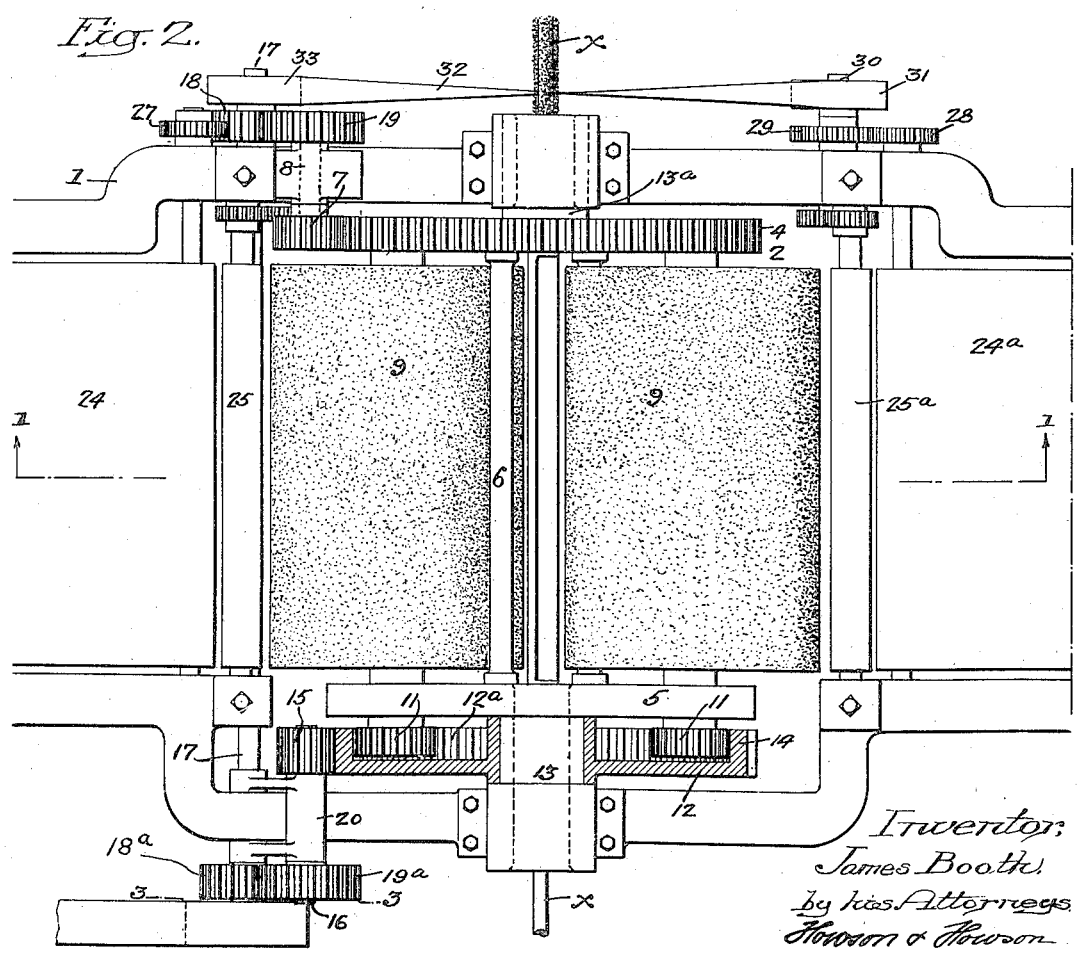

UNITED STATES PATENT OFFICE.

JAMES BOOTH, OF PHILADELPHIA, PENNSYLVANIA.

MACHINE FOR COVERING WIRE WITH FIBROUS MATERIAL.

1,343,076.  Specification of Letters Patent.  Patented June 8, 1920.

Application filed April 5, 1919. Serial No. 287,807.

*To all whom it may concern:*

Be it known that I, JAMES BOOTH, a citizen of the United States, residing in Philadelphia, Pennsylvania, have invented certain Improvements in Machines for Covering Wire with Fibrous Material, of which the following is a specification.

One object of my invention is to provide a machine for covering wire with asbestos, or other fibrous material, which acts as an insulation for the wire. The wire, with the material on it, is then passed through a coating machine to complete the insulated covering.

Another object of the invention is to provide a machine which will distribute the material evenly on the wire and which will distribute two different strands that will interlock and form a comparatively tight covering.

In the accompanying drawings:

Figure 1 is a longitudinal sectional view of my improved machine for covering wire with fibrous material on the line 1—1, Fig. 2; Fig. 2 is a plan view with one of the gear wheels in section, and Fig. 3 is a sectional view on the line 3—3, Fig. 2.

1 is the frame of the machine, which may be of any design desired. On this frame are the bearings for the carrier 2, which consists of two disks 4 and 5 connected together by rods 6, or other suitable means. The disk 4 has gear teeth on its periphery and these teeth mesh with a pinion 7 on a shaft 8 adapted to a seat in a bearing in the frame of the machine. Mounted in the two disks 4 and 5 are shafts 3 on which are mounted the cylinders 9 covered with card clothing 10, the teeth of which project in the direction indicated in Fig. 1. In place of the card clothing, garnett teeth may be used. On one end of each of the shafts 3 is a pinion 11, which meshes with internal teeth 12$^a$ on a gear wheel 12 mounted on the spindle 13 of the carrier 2. This gear wheel 12 has teeth 14 on its periphery, as well as the internal teeth 12$^a$ and the teeth 14 mesh with the teeth of a pinion 15 on a driven shaft 16. While the gear wheel 12 is of the same diameter as the toothed disk 4, the pinion 15 is of less diameter than the pinion 7, consequently, there is a differential movement.

17 is a driving shaft having gears 18, 18$^a$, which mesh with gears 19 and 19$^a$ on shafts 8 and 16 respectively, and, in the present instance, the shaft 16 is carried by an adjustable bearing 20 on the shaft 17 and held in position by a bolt 21, or other suitable fastening, so that the shaft can be adjusted when it is desired to change the gears 15.

Mounted on the carrier are two presser feet 22, which are carried by the bars 23 adjustably secured to the carrier in any suitable manner. These presser feet are adjustable toward and from the center of rotation, so that when the wire $x$ is passed through the machine the toothed cylinders place the asbestos, or other material, on the wire, while the presser feet press the fibrous material firmly in place. The hubs 13 and 13$^a$ of the carrier 2 are made hollow for the passage of the wire $x$, and this wire is held taut, being fed from one coil, or drum, to another by any suitable feeding means. There are many different coiling mechanisms now in use in wire covering machines, which may be used in connection with my improved machine.

24, 24$^a$ are feed aprons and 25, 25$^{a'}$ are feed rolls, one set being located on one side of the machine and the other set being located on the opposite side.

The feed apron 24 passes around a roller 26, which is driven in any suitable manner. In the present instance, a gear wheel 27 on the shaft of the roller 26 meshes with the gear wheel 18 on the shaft 17 and the rolls 25 are geared together and to said shaft 17, as shown. The feed apron 24$^a$ passes around a roller 26$^a$, on the shaft of which is a gear wheel 28 meshing with a gear wheel 29 on a shaft 30. This shaft is also geared to the rolls 25$^a$, as shown. On the shaft 30 is a pulley 31 around which passes a belt 32 from a pulley 33 on the shaft 17.

The asbestos, or like material, is fed onto feed aprons 24, 24$^a$ in any suitable manner, and the aprons feed the material to the feed rolls 25, 25$^a$ which hold the material sufficiently to allow the teeth 10 on the cylinder 9 to pull the fiber from the mass as it is fed forward and carry it to the wire.

In the present instance, the carrier revolves in the direction of the arrow and the two cylinders 9 revolve around their axes in the direction indicated by their arrows, which is opposite to the direction of the carrier, and as there is a differential movement, due to the difference of the diameters of the two pinions 7 and 15, the surface of the cylinders 9 pass the wire at a reduced speed.

The operation is as follows: The wire to be covered with asbestos, for instance, is coated with a cementitious material, and is fed through the machine at a given speed. The machine is set in motion and the web of asbestos is fed over the aprons to the feed rolls and projected into the path of the teeth of the cylinders 9. Each cylinder, as it passes the feed rolls, removes a given quantity of asbestos fiber. The travel of each cylinder is such that when the cylinder passes the other pair of feed rolls, the cylinder has moved on its axis a certain distance so that a clean set of teeth is in position to engage the fiber projected by this last set of feed rolls. By the alternate feeding of the asbestos to the cylinders an even distribution of the asbestos to the cylinders is secured so that when that portion of the material is fed into the wire, the wire is evenly covered and the presser feet compact the covering on the surface of the wire.

I claim:

1. The combination in a machine for covering wire with a fibrous material, of a frame; a carrier mounted in the frame; means for driving the carrier at a given speed; two toothed cylinders, the peripheries of said cylinders projecting the same distance from the center of rotation of the carrier; means for turning the cylinders in their bearings while being rotated by the carrier; and means for feeding fibrous material to the toothed cylinders so that the toothed cylinders will receive material from the feeding means and will deposit it onto a wire passing through the center of the machine.

2. The combination in a machine for covering wire with fibrous material, of a frame; a carrier mounted to rotate in the frame; said carrier having hubs, the hubs being hollow for the passage of wire to be covered; a pair of feed rolls and a toothed cylinder mounted in the carrier for transferring fiber from the feed rolls to the wire; means for rotating the carrier at a given speed; and means for differentially rotating the cylinder in a direction opposite to the direction of rotation of the carrier.

3. The combination in a machine for covering wire with fibrous material, of a frame; a carrier having hollow hubs mounted on the frame, the wire passing through the hubs; two toothed cylinders; shafts therefor mounted to rotate with the carrier; means for feeding material to the toothed cylinders so that the said cylinders will engage the material and transfer it to the wire; means for driving the carrier; a gear wheel having internal teeth, the shafts on which the cylinders are mounted having pinions engaging the internal teeth; and means for turning the internal toothed wheel.

4. The combination in a machine for covering wire with fibrous material, of a carrier having hollow hubs for the passage of the wire and mounted in the frame of the machine; a gear wheel, forming part of the carrier; a pinion meshing with the gear wheel; a gear wheel arranged to travel on the same center but independent of the carrier; a pinion for driving said gear wheel, the independent gear wheel having internal teeth; a toothed cylinder; a shaft on which the cylinder is mounted, said shaft being adapted to bearings in the carrier; a pinion on the end of the shaft engaging the internal teeth of the gear wheel; and means for feeding material to the toothed cylinder.

5. The combination of a frame; a carrier mounted on the frame; two toothed cylinders; a shaft for each cylinder; said shafts being mounted on the carrier; means on the opposite sides of the carrier for feeding material to the cylinders; means for rotating the carrier; and differential mechanism for rotating the cylinders in the direction opposite to the direction of rotation of the carrier.

6. The combination of a frame; a carrier mounted on the frame; two toothed cylinders; a shaft for each cylinder, said shafts being mounted on the carrier; means on the opposite sides of the carrier for feeding material to the cylinders; means for rotating the carrier; differential mechanism for rotating the cylinders in the direction opposite to the direction of rotation of the carrier, said carrier having hollow hubs through which the wire to be covered is passed.

7. The combination of a frame; a carrier mounted on the frame; two toothed cylinders; a shaft for each cylinder; said shafts being mounted on the carrier; means on the opposite sides of the carrier for feeding material to the cylinders; means for rotating the carriers; differential mechanism for rotating the cylinders in the direction opposite to the direction of rotation of the carrier, said carrier having hollow hubs through which the wire to be covered is passed; and presser feet extending between the two cylinders to a point near the wires so that they will press the fibers onto the wire.

8. The combination in a machine for covering wire with asbestos and like material, of two sets of feed rolls; feed aprons for feeding the material to the rolls; a carrier having hubs mounted in the frame and located between the two pairs of feed rolls; means for rotating the carrier; two shafts, one on each side of the center of the carrier; a toothed cylinder mounted on each shaft; a wheel having internal teeth; a pinion on each cylinder shaft meshing with the internal teeth of the wheel; and means for driving said wheel; and two presser feet mounted on the carrier and movable toward and from the center of rotation of the carrier so as to press the fibers onto the wire.

9. The combination in a machine for covering wire with asbestos and like material, of a frame; a carrier having hollow hubs mounted on the frame, the hubs being hollow for the passage of the wire; two shafts mounted in the carrier; a toothed cylinder on each shaft; a pinion on the end of the shafts; a gear wheel arranged to turn on the same center as the carrier, said gear wheel having internal and external teeth; pinions on the shafts meshing with the internal teeth of the wheel; two driving shafts geared together so as to rotate at the same speed, each driving shaft having pinions, the pinions of one driving shaft meshing with the teeth on the carrier; and a pinion on the other driving shaft meshing with the external teeth on the wheel, the two pinions being of different diameters so that a differential motion will be imparted to the cylinders as the carrier rotates.

In witness whereof I affix my signature.

JAMES BOOTH.